C. H. DRAPER.
POWER TRANSMITTING MECHANISM.
APPLICATION FILED DEC. 29, 1908.
940,861.
Patented Nov. 23. 1909.
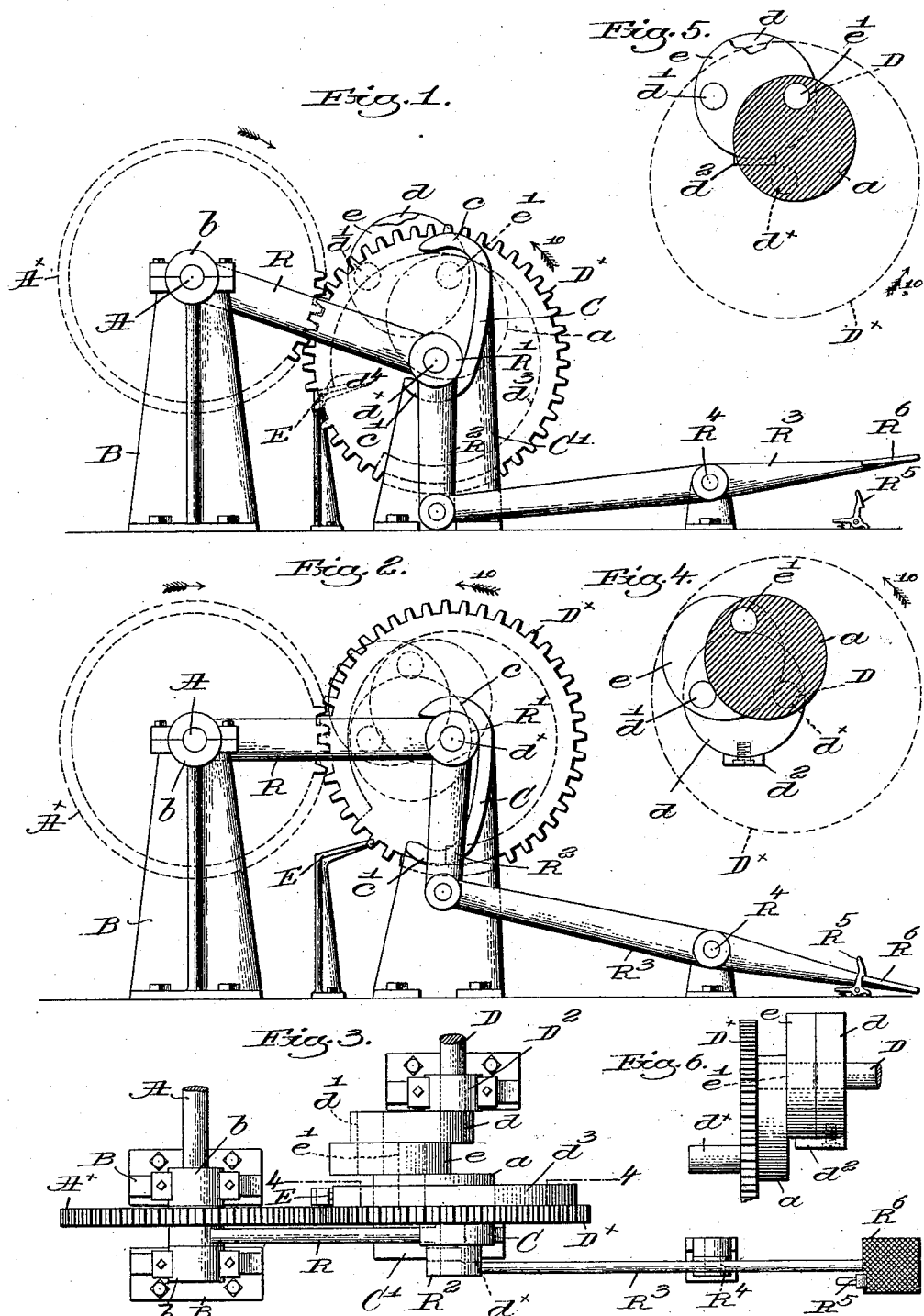

UNITED STATES PATENT OFFICE.

CLARE H. DRAPER, OF HOPEDALE, MASSACHUSETTS.

POWER-TRANSMITTING MECHANISM.

940,861.

Specification of Letters Patent.

Patented Nov. 23, 1909.

Application filed December 29, 1908. Serial No. 469,874.

*To all whom it may concern:*

Be it known that I, CLARE H. DRAPER, a citizen of the United States, and resident of Hopedale, county of Worcester, State of Massachusetts, have invented an Improvement in Power-Transmitting Mechanism, of which the following description, in connection with the accompanying drawing, is a specification, like characters on the drawing representing like parts.

This invention has for its object the production of novel power transmitting mechanism whereby the power may be transmitted positively from a rotating driving member to a driven member, to rotate the latter, while at the same time the driving and driven members may be coupled or uncoupled as desired, without the intervention of clutches or similar devices.

Driving and driven members have heretofore been positively connected by gearing, but in order to uncouple one member from the other two gears have been thrown out of engagement, or some kind of a clutch device has been employed.

To bring gears into and out of mesh when one is continuously rotated is objectionable, owing to the danger of stripping the teeth and the harsh action when the gears are thrown into engagement, while clutch devices are more or less apt to slip, depending upon their construction and condition.

In my present invention the power is transmitted from the driving to the driven member, through two gears which are always in mesh, and in the present embodiment of the invention one gear is fixedly connected with the driven member, while the other gear is connected in a peculiar manner with the driving member and is shiftable to effect its rotation with said member, or to permit it to remain quiescent while the driving member continues to rotate.

The various novel features of my invention will be fully described in the subjoined specification and particularly pointed out in the following claims.

Figure 1 is a front elevation of power transmitting mechanism embodying one form of my invention, the driving and driven members being disconnected or uncoupled; Fig. 2 is a similar view but with the driving and driven members coupled together; Fig. 3 is a top plan view of the mechanism in the position shown in Fig. 2; Fig. 4 is a vertical section on the irregular line 4—4, Fig. 3, showing the peculiar connection between the driving member and the shiftable gear; Fig. 5 is a similar sectional view but showing the connection between the driving member and the shiftable gear when the driving and driven members are uncoupled, as in Fig. 1; Fig. 6 is a right hand side elevation of the connection as shown in Figs. 1 and 5.

Herein I have illustrated one practical embodiment of my invention, with simple means for effecting the shifting of the driving gear, but it is to be understood that such embodiment of my invention is for illustrative purposes, as it may be utilized in many different forms and mechanical structures without departing from the spirit and scope of my invention.

Referring to Figs. 1, 2 and 3, the driven member is shown as a rotatable shaft A suitably mounted in bearings $b$ on stands B, said member A having fixedly attached to it a gear $A^\times$, the shaft having pivotally hung upon it one end of a radius bar R, interposed between the hub of the gear $A^\times$, and one of the bearings $b$, as shown in Fig. 3.

The free end of the radius-bar has a hub R' in which is rotatably journaled the short shaft $d^\times$ of a gear $D^\times$ shown herein as of the same diameter as the gear $A^\times$ and in continuous mesh therewith whatever be the angular position of the radius bar, as will be obvious, but the relative diameter of the gears may be varied as desired.

$A^\times$ is the driven gear and $D^\times$ is the driving gear, in the present embodiment of my invention, and when the gear $D^\times$ is rotated, as will be described, the gear $A^\times$ will be positively rotated and it in turn causes rotation of the fixedly attached driven member or shaft A.

As shown herein the hub R' is shiftable in a curved, open guide C rigidly secured to or forming part of a standard C', the upper and lower ends of the guard curving over at $c$, $c'$ to seat the hub when in its raised or lowered position, Figs. 2 and 1 respectively.

Any suitable means for shifting the radius bar and the gear $D^\times$ may be employed, and for the purpose I have herein shown a treadle lever $R^3$ fulcrumed at $R^4$ and connected by a link $R^2$ with the radius bar, a spring-latch $R^5$ coöperating with the foot-plate $R^6$ of the treadle-lever to lock it in the position shown in Figs. 2 and 3, with the driving gear $D^x$ elevated in position to transmit rotation to the gear $A^x$.

The driving member is herein shown as a shaft D rotatably mounted in a suitable fixed bearing $D^2$, Fig. 3, and so located that it will be axially alined with the shaft $d^x$ of the gear $D^x$ when the latter is positioned as shown in Fig. 2, the adjacent end of the driving shaft being laterally separated from the gear $D^x$, as shown in Fig. 3. Said gear has fixedly secured to or forming part of its inner face a preferably circular cheek $a$ eccentric to the center of the gear, as shown in Figs. 4 and 5, its relation to the gear-shaft $d^x$ being clearly illustrated in said figures.

A circular or disk crank $d$ is eccentrically mounted on the end of the driving member D between the bearing $D^2$ and the gear $D^x$, and a circular or disk link $e$ is interposed between the crank and the cheek $a$, said link being pivotally connected at $d'$ with the outer end of the crank at $e'$ with the cheek.

The pivotal points $d'$ and $e'$ are diametrically opposite each other on the link, and the pivotal points $d^x$ and $e'$ are diametrically opposite each other on the cheek, while the end of shaft D and the pivot $d'$ are similarly located with respect to the crank $d$, the centers of each pair of points above mentioned being the same distance apart.

I make the several parts $d$, $e$ and $a$ as like circular disks for the sake of the lateral bearing which they afford each other, as they are placed close together, Figs. 3 and 6, so that their flat faces contact and wipe over each other when the mechanism is changed from the position shown in Fig. 1 to that shown in Fig. 2, and vice versa, and when in the position shown in Fig. 1 the face of the link $e$ wipes over the adjacent face of the cheek $a$ as the shaft D continues to rotate.

Upon one face of the gear $D^x$ I form a segmental flange or lip $d^3$, and when said gear is in running position, Fig. 2, the outer face of the flange or lip $d^3$ is close to or substantially touching a fixed stop E, the coöperation of the stop and flange making it impossible for the gear $D^x$ to move into the position shown in Fig. 1 except at the proper time, viz:—when the opening or gap between the ends of the flange is opposite the stop E. That is, when said gear is in its operative position it can only be shifted to inoperative position, Fig. 1, when the gap in the segment $d^3$ is opposite the stop, and if the direction of rotation of gear $D^x$ is indicated by arrow 10 then the end $d^4$ of the segment will engage the stop E when shifting is effected, as shown in Fig. 1.

Now consider the mechanism first in the inoperative position (so far as regards rotation of gears $A^x$ and $D^x$) shown in Figs. 1 and 5. At such time gear $D^x$ is in its lower position, the stop E projecting into the gap in the segment and the cheek $a$ is thereby positioned with the pivot $e'$, connecting said cheek and the link $e$, in alinement with the driving member D, see Fig. 5, so that rotation of the latter will revolve the crank $d$ and link $e$ side by side about D and $e'$ as centers, there being no relative movement of the crank and link, and hence the driving member can rotate continuously, but no rotative movement will be imparted to the gear $D^x$. Consequently gear $A^x$ and the attached driven member A will be quiescent, and the engagement of the gears holds the driven member from any accidental rotation inasmuch as the driving gear $D^x$ is locked by the engagement of the segment end $d^4$ with the stop E.

A lateral shoe $d^2$ is fixedly attached to the periphery of the crank and projects across the periphery of the link $e$, as best shown in Fig. 6, the face of the shoe being concaved to fit the periphery of the link, and preventing shifting of the gear $D^x$ to operative position except when the parts are in substantially the position shown in Fig. 5, with the pivotal connection $d'$ at the left of a vertical line passing through the axis of rotation of the gear $D^x$. When the latter is shifted to operative position it tends to raise the link $e$ and swing it upward and forward on the pivotal connection $d'$ between the link and the crank $d$, and as the latter is moving forward in the same direction the shoe $d^2$ offers no obstruction to the shifting of the gear.

If it were not for the shoe the shifting of gear $D^x$ to operative position could be effected at a time when the connection $d'$ was at the right of a vertical line passing through the axis of rotation of said gear, and that would be objectionable because of a change in the relative position of the crank and link tending to cramp the parts. So, too, if the shoe is omitted there is a tendency, in shifting gear $D^x$ from operative to inoperative position, to partly turn the link $e$ in a direction opposite to that due to rotation of the crank $d$, and the two forces acting oppositely would cause breakage of parts.

Suppose that the mechanism is in the position shown in Figs. 1 and 5, the driving member running free, and it is desired to throw the driven member A into operation. The operator places his foot on the footplate $R^6$ and presses down thereupon, and the instant the pivotal connection $d'$ is brought by the revolving crank $d$ into substantially the position shown in Fig. 5 the lever $R^3$ will rock, acting through link $R^2$ to swing the radius bar R into the position shown in Fig. 2, elevating the hub $R'$ to the upper end of the guide C, and the shoe offers no opposition to such movement.

This shift of the gear $D^x$ brings its shaft $d^x$ into alinement with the driving member D, Fig. 4, and the end of the link $e$ connected with the cheek $a$ is swung upward and forward as the end having the pivotal connection $d'$ with the crank swings downward and rearward, the rearrangement of crank, link and cheek when shifting is completed being clearly shown in Fig. 4, the pivotal points $d'$, $e'$, $d^x$ being the apices of an equilateral triangle. The revolution of the crank $d$ with the driving member D acts through link $e$ to pull the cheek $a$ around after it, the cheek revolving with the shaft $d^x$ as its center of revolution and as the cheek and gear $D^x$ are rigidly connected the gear is revolved and through the gear $A^x$ rotation is transmitted to the driven member A.

The latch $R^5$ keeps the parts in operative position, but to uncouple or disconnect the driving and driven members the latch is moved to release the treadle lever $R^3$ and as soon as the gap in the segment $d^3$ arrives opposite the stop E the radius bar swings down to the position shown in Fig. 1, shifting the gear $D^x$ to stopping position. As this shift and stoppage of said gear positions the pivot $e'$ between the cheek and the link in axial alinement with the driving member, as in Fig. 5, the crank and link come together side by side and revolve together on D and $e'$ as their centers of revolution. Thus a positive transmission of power is effected from the driving to the driven member when desired, by means of the gears, and the driving and driven members are uncoupled without disengaging the gears. In other words the driven member is thrown into or out of operation at will without the use of clutches or similar devices, and a positive power transmission is effected when the driven gear is thrown into operation.

It will be understood that the cheek $a$ is to all intents and purposes a part of the gear $D^x$, and so long as the relationship is maintained between the pivotal connections between crank, link and gear the precise contour of the cheek is immaterial. So, too, the crank and link could be made as arms having lateral bearing faces adjacent only their pivotal connecting points but as a much better and firmer bearing is effected by the disk form described I prefer to use it.

The link $e$ acts as a tension member when the driving member D is rotated in the direction of the arrow 10, and follows the crank, pulling the gear $D^x$ after it, but if the rotation of the member D is opposite to arrow 10 then the link $e$ is a compression member, the crank pushing the link ahead of it and the link in turn pushes ahead the gear $D^x$. With such reverse direction of rotation the stoppage of gear $D^x$ will be effected as before, when the gap in the segment $d^3$ is opposite the stop E, the pivotal portions $d^x$ and $e'$ assuming the relative positions shown in Figs. 1 and 5, with the pivot $e'$ in axial alinement with shaft D. The shifting of the said gear, however, will be effected as described, and only when the gap in said segment is opposite the stop E can the driven member be thrown out of operation, and it can be thrown into operation only when the shoe $d^2$ is positioned as has been described, substantially diametrically opposite the segment gap.

It is unnecessary to indicate the various uses to which my novel power transmitting mechanism may be put, as such uses are numerous and form no part of the invention itself.

Various modifications or changes may be made in details of construction and arrangement without departing from the spirit and scope of my invention as set forth in the claims annexed hereto.

Having fully described my invention, what I claim as new and desire to secure by Letters Patent is:—

1. In power transmitting mechanism, a driving member, a driven member, a gear attached thereto, a second gear in continuous mesh therewith and shiftable into and out of axial alinement with the driving member, a crank on the latter, and a link pivotally connected with the crank, and also with the shiftable gear eccentric to its center, revolution of the crank acting through the link to positively rotate the shiftable gear when coaxial with the driving member and leaving the gear inert when its connection with the link is coaxial with the driving member.

2. In power transmitting mechanism, a driving member, a driven member, a plurality of gears in continuous mesh, one being attached to the driven member and another being shiftable into and out of coaxial alinement with the driving member, and a link pivotally connected with said member and the shiftable gear at equal distances from their axes of rotation, said gear being rotated by the driving member through said link when the gear and driving member are co-axial, the link revolving about its pivotal connection with the gear when said connection is alined with the driving member.

3. In power transmitting mechanism, a driving member, a driven member, a plurality of gears in continuous mesh, one being attached to the driven member and another being shiftable into and out of coaxial alinement with the driving member, and a link pivotally connected with said member and the shiftable gear at equal distances from their axes of rotation, said gear being rotated by the driving member through said link when the gear and driving member are coaxial, the link revolving about its pivotal connection with the gear when said connection is alined with the driving member, combined with a stop for said gear when in such latter position.

4. In power transmitting mechanism, a driving member, a driven member, a plurality of gears in continuous mesh, one being attached to the driven member and another being shiftable into and out of coaxial alinement with the driving member, and a link pivotally connected with said member and the shiftable gear at equal distances from their axes of rotation, said gear being rotated by the driving member through said link when the gear and driving member are coaxial, the link revolving about its pivotal connection with the gear when said connection is alined with the driving member, combined with a stop for said gear when in such latter position, and means to prevent shifting of the gear into axial alinement with the driving member except at a predetermined position of the link relatively to the shiftable gear.

5. In power transmitting mechanism, a driving member, a driven member, a plurality of gears in continuous mesh, one being attached to the driven member and another being shiftable into and out of co-axial alinement with the driving member, a rigid connection pivoted to the driving member and to the shiftable gear at equal distances from their axes of rotation, to effect rotation of the gear when the latter is in running position, and means to prevent shifting of said gear to stopping position except at a predetermined point of its angular movement.

6. In power transmitting mechanism, a driving member, a driven member, a plurality of gears in continuous mesh, one being attached to the driven member and another being shiftable into and out of co-axial alinement with the driving member, a disk crank fast thereon, a like link pivotally connected with the crank and the shiftable gear at equal distances from their axes of rotation, the crank and link laterally supporting each other, and means to shift the gear into running position, coaxial with the driving member, and into stopping position, with its pivotal connection with said link co-axial with the driving member.

7. In power transmitting mechanism, a driving member, a driven member, a plurality of gears in continuous mesh, one being attached to the driven member and another being shiftable into and out of co-axial alinement with the driving member, a rigid connection pivoted to the driving member and to the shiftable gear at equal distances from their axes of rotation, to effect rotation of the gear only when co-axial with the driving member, a segmental flange on the shiftable gear, and a fixed stop to coöperate with one end of the flange when the shiftable gear is in stopping position, the flange preventing shift of the gear to such position until the stop is between the ends of the flange.

8. In power transmitting mechanism, a driving member, a driven member, a plurality of gears in continuous mesh, one being attached to the driven member and another being shiftable into and out of co-axial alinement with the driving member, and a link pivotally connected with said member and the shiftable gear at equal distances from their axes of rotation, the driving member, when co-axial with the shiftable gear, acting through the link to rotate it, said link revolving relatively to said gear on its pivotal connection therewith when such connection and the driving member are alined, combined with means to act on the link permitting shift of the gear to running position only when the link is in proper position relatively thereto.

9. In power transmitting mechanism, a driving member, a driven member, a plurality of gears in continuous mesh, one being attached to the driven member and another being shiftable into and out of co-axial alinement with the driving member, and a link pivotally connected with said member and the shiftable gear at equal distances from their axes of rotation, the driving member, when coaxial with the shiftable gear, acting through the link to rotate it, said link revolving relatively to said gear on its pivotal connection therewith when such connection and the driving member are alined, combined with means revolving with the driving member to act on the link permitting shift of the gear to running position only when the link is ahead of its pivotal connection with the shiftable gear.

10. In power transmitting mechanism, a driven member, a gear attached thereto, a rotating driving member, a gear shiftable into and out of axial alinement with said driving member and in continuous engagement with the first-named gear, and means intermediate the driving member and the shiftable gear and in permanent connection with each to effect rotation of the said shiftable gear with the driving member when one is coaxial with the other.

11. In power transmitting mechanism, a rotating driving member, a driven member, gearing intermediate the said members, including a shiftable gear movable into and out of axial alinement with the driving member, and means between the latter and the shiftable gear and in permanent connection with the driving member and the gear to positively rotate the latter when it is co-axial with the driving member.

12. In power transmitting mechanism, driving and driven members, a plurality of continuously meshing gears one of which is fixedly connected with the driven member, and means positively and permanently connecting the driving member and another of said gears, to at will effect rotation of the gears by said driving member.

13. In mechanism of the class described, driving and driven members, a train of gears in continuous mesh, one being fixedly attached to the driven member, means to shift another gear into and out of axial alinement with the driving member, and a positive and permanent connection between the latter and the shiftable gear to rotate the gear in unison with the driving member when said gear is coaxial therewith.

14. In power transmitting mechanism, a driven member a gear attached thereto, a shiftable gear always in mesh therewith, a rotating driving member, a crank thereon, a link pivotally connected with the crank and with the shiftable gear, equi-distant from the centers of said gear and the driving member, respectively and means to shift the gear to bring its center, or the pivotal connection with the link, into axial alinement, with the driving member, to effect rotation of said gear through the crank and link or permit revoluble movement of the link with the crank on the pivotal connection of the link with said gear, respectively.

15. In mechanism of the class described, rotatable driving and driven members, gearing to transmit positively rotative movement to the driven member, an actuating instrumentality between the driving member and said gearing, and positively connected with each, and means to effect a change in the relative positions of the driving member and the gearing to thereby render said actuating connection operative or inoperative.

In testimony whereof, I have signed my me to this specification, in the presence of two subscribing witnesses.

CLARE H. DRAPER.

Witnesses:
 FRANK J. DUTCHER,
 J. L. REMINGTON, Jr.